US009684860B2

(12) United States Patent
Zambrano L.

(10) Patent No.: US 9,684,860 B2
(45) Date of Patent: Jun. 20, 2017

(54) PERSONAL CARDS FORMED FROM PRECIOUS METALS OR PRECIOUS METAL ALLOYS

(71) Applicant: Card Limited, LLC, Lehi, UT (US)

(72) Inventor: Jose J. Zambrano L., Fort Lauderdale, FL (US)

(73) Assignee: Card Limited, LLC, Lehi, UT (US)

( * ) Notice: Subject to any disclaimer, the term of this patent is extended or adjusted under 35 U.S.C. 154(b) by 0 days.

(21) Appl. No.: 14/022,014

(22) Filed: Sep. 9, 2013

(65) Prior Publication Data

US 2014/0070009 A1 Mar. 13, 2014

Related U.S. Application Data

(60) Provisional application No. 61/698,485, filed on Sep. 7, 2012.

(51) Int. Cl.

| | |
|---|---|
| ***G06K 19/02*** | (2006.01) |
| ***B42D 25/43*** | (2014.01) |
| ***B42D 25/425*** | (2014.01) |
| ***B42D 25/305*** | (2014.01) |
| ***B42D 25/369*** | (2014.01) |
| ***B42D 25/324*** | (2014.01) |
| ***B42D 25/373*** | (2014.01) |

(52) U.S. Cl.

CPC ........... *G06K 19/02* (2013.01); *B42D 25/305* (2014.10); *B42D 25/324* (2014.10); *B42D 25/369* (2014.10); *B42D 25/373* (2014.10); *B42D 25/425* (2014.10); *B42D 25/43* (2014.10)

(58) Field of Classification Search

CPC B42D 15/0013; B42D 15/10; B42D 2033/10; B42D 2033/20; B42D 2035/24; B42D 25/373

USPC ................................................. 235/487, 488

See application file for complete search history.

(56) References Cited

U.S. PATENT DOCUMENTS

| | | | | |
|---|---|---|---|---|
| 4,931,629 | A | 6/1990 | Frankfurt | |
| 5,169,155 | A | 12/1992 | Soules et al. | |
| 5,626,937 | A | 5/1997 | Morikawa et al. | |
| 5,735,550 | A | 4/1998 | Hinkle | |
| 6,025,283 | A * | 2/2000 | Roberts | 442/15 |
| 7,398,917 | B2 | 7/2008 | Aibazov et al. | |
| 8,490,866 | B1 | 7/2013 | Aibazov | |
| 2005/0001419 | A1* | 1/2005 | Levy | B41M 5/24 281/2 |
| 2006/0086802 | A1 | 4/2006 | Tolkowsky | |
| 2006/0102729 | A1* | 5/2006 | Gandel et al. | 235/487 |

(Continued)

FOREIGN PATENT DOCUMENTS

KR 10-2010-0118379 11/2010

OTHER PUBLICATIONS

International Search Report, PCT/US2013/058812, 3 pages, Dec. 19, 2013.

(Continued)

*Primary Examiner* — Jamara Franklin

(74) *Attorney, Agent, or Firm* — Holland & Hart LLP

(57) ABSTRACT

An example embodiment includes a transaction card. The transaction card includes a card body and information. The card body is made from a precious metal alloy. The card body has a front surface and a back surface. At least some portion of the information is defined by disruptions to the precious metal alloy of the card body.

19 Claims, 5 Drawing Sheets

(56) References Cited

U.S. PATENT DOCUMENTS

| | | | | |
|---|---|---|---|---|
| 2006/0249042 | A1 * | 11/2006 | Heim et al. | 101/483 |
| 2008/0245865 | A1 | 10/2008 | Mosteller | |
| 2011/0031319 | A1 | 2/2011 | Kiekhaefer et al. | |
| 2011/0315781 | A1 | 12/2011 | Varga et al. | |
| 2013/0091044 | A1 | 4/2013 | Reed et al. | |

OTHER PUBLICATIONS

English Abstract and English Machine Translation of Specification and Claims of KR10-2010-0118379, Nov. 5, 2010.

* cited by examiner

PERSONAL CARDS FORMED FROM PRECIOUS METALS OR PRECIOUS METAL ALLOYS

CROSS-REFERENCE TO RELATED APPLICATIONS

This patent application claims the benefit of and priority to U.S. Provisional Patent Application No. 61/698,485, filed Sep. 7, 2012, which is incorporated herein by reference in its entirety.

FIELD

Embodiments disclosed herein relate to personal cards such as transaction cards, identification cards, and the like. More specifically, some embodiments relate to personal cards that are substantially formed from solid metal. In particular, some example embodiments relate to personal cards that are substantially formed from precious metals or their alloys, including transaction cards with solid 14 karat (K) gold bodies.

BACKGROUND

The size of transaction cards (e.g., a bank card, such as a credit card or a debit card, etc.) is 85.60 mm×53.98 mm (3⅜ inches×2⅛ inches) and rounded corners, each having a radius of 2.88 mm to 3.48 mm, in conformance with the ISO/IEC 7810 ID-1 standard, as defined by the International Organization for Standardization (ISO). In addition to the defining the acceptable dimensions of a typically transaction card, the ISO/IEC 7810 ID-1 standard also determines various acceptable characteristics of the card. For example, the ISO/IEC 7810 ID-1 standard determines a bending stiffness, flammability, toxicity, chemical resistance, dimensional stability, resistance to deterioration from exposure to heat and light, and durability. The ISO/IEC 1812 standard defines the format in which transaction cards are numbered.

Transaction cards are often formed from plastic, typically polyvinyl chloride (PVC), which is flexible, durable and meets the other requirements of the ISO/IEC 7810ID-1 standard. Metals have also been used to form transaction cards. However, to comply with the ISO/IEC 7810 ID-1 standard—particularly the flexibility Requirements—metal layers are sometimes laminated onto the surfaces of a plastic layer, or core. Transactional cards that include a plastic core laminated with metal layer suffer from several shortcomings. Specifically, the metal layers may delaminate from the plastic core. Solid metals have also been used. Specifically, titanium has been used to form some versions of the American Express Centurion® card.

More ornate transaction card have also been disclosed. For example, some ornate transaction cards include precious metals, gems, rare woods and other precious materials such as ivory, in combination with one another. However, the ornate transaction cards that include assemblies of different pieces are impractical. Additionally, the ornate transaction cards often fail to comply with the flexibility requirements of the ISO/IEC 7810 ID-1 standard due to the manner in which gems are secured to metal.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a transaction card. The transaction card includes a card body and information. The card body is made from a precious metal alloy. The card body has a front surface and a back surface. At least some portion of the information is defined by disruptions to the precious metal alloy of the card body.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Figure 1A:
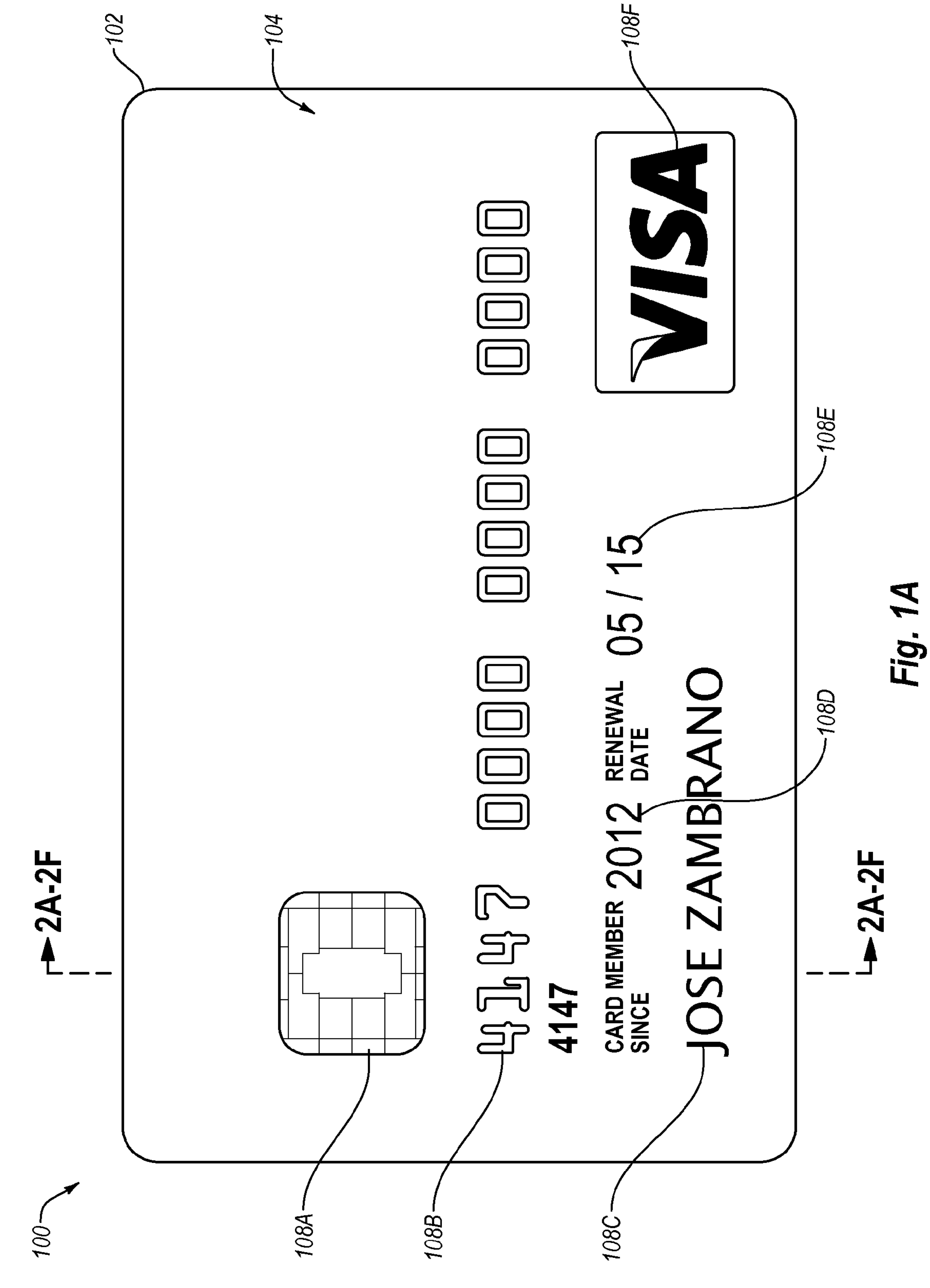
FIGS. 1A and 1B illustrate an example personal card.

Some embodiments described herein relate to personal cards, such as transaction cards and identification cards. Some examples of transaction cards may include bank cards, credit cards, debit cards, and the like. Some examples of identification cards may include driver's licenses, passports, employee identification badges, student identification cards, library cards, and the like.

In an example embodiment, the personal card includes a card body and information. The information includes identifying information, security information, a transaction card issuer, and expiration information. The card body may be made from a precious metal alloy. The card body has a front surface and a back surface. At least some portion of the information may be defined by the card body such that the portion of the information is visible on the front surface or the back surface due to a disruption of the precious metal alloy corresponding to the portion of the information.

In this and other embodiments, some or all of the information may be defined by the card body as opposed to adhering or otherwise attaching the information to the card body.

The card body may be made from a precious metal or a precious metal alloy, either alone or in combination with other materials. The phrase "substantially," when used in connection with a card body, a substrate, and a coating, refers to a primary component (i.e., a metal) of the material (e.g., an alloy, etc.) from which the card body, the substrate, or the coating is formed. As a non-limiting example, a card body that comprises "substantially" gold may comprise a gold alloy, such as 14 karat (K) gold or even 10K gold, which is less than fifty percent 50% gold, by weight, but is still present in greater amounts than any other component of the alloy. The phrase "consisting essentially of" when used in connection with a card body, a substrate, and a coating refers to an embodiment in which the card body, the substrate, or the coating includes a single material with some trace amounts of another material (or materials), which, for example, cannot be removed from the material through economically viable means or are otherwise present. For example, the card body may be 99.9% troy silver, 24 K gold, etc.

As used herein, a "precious metal alloy" is a metal alloy whose primary component is a precious metal, although the precious metal need not form the majority of the alloy. Again, 24 K gold, 22 K gold, 18 K gold, 14 K gold, 10 K gold, 9 K gold, and all colors of gold such as green, grey, black, rose, purple, spangold, blue, red, pink, white and yellow are non-limiting examples of precious metal alloys. As alternatives to gold, other precious metals or precious metal alloys may be used to form a card body. Without limitation, a card body may be made from platinum, palladium, or silver or an alloy that includes or substantially includes any of the foregoing.

The information may be embodied in the personal card in any suitable way. For example, the information may include, but is not limited to, one or more alpha-numeric characters, one or more identifiers, one or more security features, one or more security features, an EMV chip, a magnetic strip, a signature stripe, or any combination thereof. The security features may include a security chip, a hologram, a pattern etched into the card body, or the like. The identifier may include a logo, for instance. In some embodiments, at least some of the identifying information may be formed completely by or in the card body, may be defined by a contrast between colors of a substrate and one or more coatings, or some combination thereof. Some additional example embodiments are described in conjunction with the appended drawings.

Figure 1B:
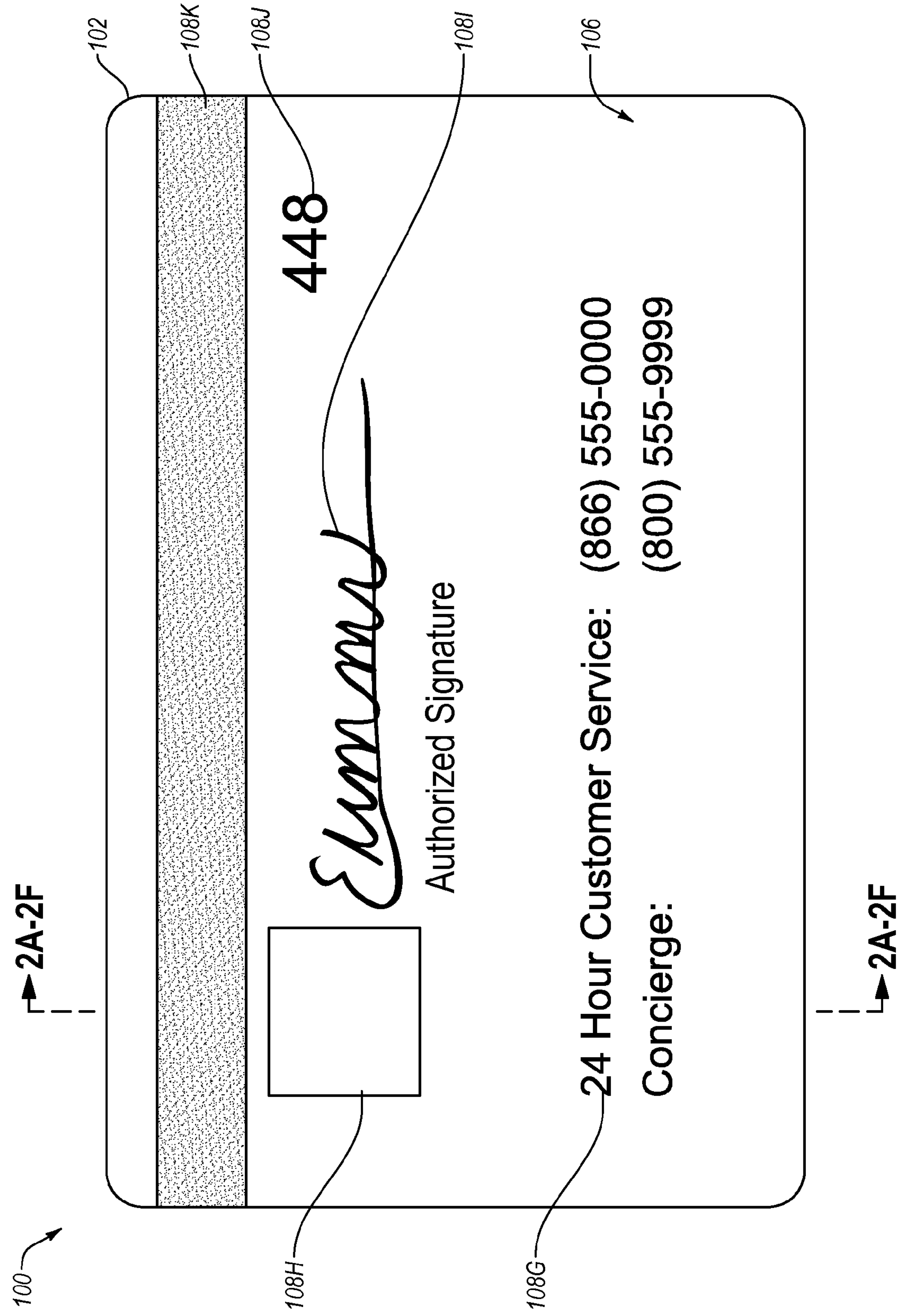

FIGS. 1A and 1B illustrate an example personal card 100 in accordance with at least one embodiment disclosed herein. FIG. 1A depicts a front view of the personal card 100 and FIG. 1B depicts a rear view of the personal card 100. In the depicted embodiment, the personal card 100 is a transaction card, such as a credit card or debit card. Although FIGS. 1A through 2F depict the personal card 100 as a transaction card, the teachings of this disclosure are also applicable to other types of personal cards, including, without limitation, drivers' licenses, passports, employee identification badges, student identification cards, library cards, and the like. In embodiments in which the personal card 100 is a transaction card, the card body may comply with the requirements of ISO/IEC 7810 ID-1. In other embodiments, in which the personal card 100 is another type of personal card, the card body 102 may be configured to comply with one or more other appropriate standards. For example, the card body 102 may conform to other ISO/IEC 7810 standards or the like.

With reference to FIGS. 1A and 1B, the personal card 100 includes a card body 102 with a front side 104 and an opposite, back side 106. The personal card 100 may also include information 108A-108K (generally, "information 108"). The information 108 may be carried by the front side 104 and/or back side 106 of the card body 102.

In some embodiments, the personal card 100 may only include the card body 102 and the information 108. In these and other embodiments, some or all of the information 108 may be defined by the card body 102 and/or through a combination of a substrate and coatings as described below.

The personal card 100, and specifically the card body 102, may be made from a precious metal or a precious metal alloy. For example, the card body 102 of the personal card 100 may include or may be substantially silver, palladium, platinum, another precious material, or another precious metal alloy. Some specific embodiments of the personal card 100, may include the card body 102 formed from 14 K gold, 10 K gold, 18K gold, 24 K gold, or some combination thereof.

The precious metal or precious metal alloy from which the card body 102 is formed may be durable. The durability of the card body 102 may enable the card body 102 to retain its shape and to minimize the loss of information 108 carried by the card body 102. For example, the card body 102 may include a sufficient flexibility and durability to enable the personal card 100 to comply with the requirements of ISO/IEC 7810 ID-1 and the like.

In some embodiments in which the card body 102 is substantially a precious metal alloy, the information 108 may be defined by the card body 102. For example, the information 108 may be defined by way of indentations or recesses in one or more surfaces of the card body 102. Additionally or alternatively, the information 108 may be affixed to the card body 102 and/or may be defined by contrasting a substrate with one or more coatings applied to the substrate. Some additional details of the information 108 are provided with reference to FIGS. 2A-2F.

With specific reference to FIG. 1A, in the depicted embodiment, in which the personal card 100 is a transaction card, the information 108A-108F may be carried by the front surface 104 of the card body 102. The information 108A-108F may include one or more of a cardholder name 108C, an account number 108B, an expiration date 108E, a security feature 108A, an indicator of the year 108D in which the cardholder opened her account, and an identifier 108F. In these and other embodiments, the security feature 108A may include, but is not limited to a security chip, a hologram, or an image of the cardholder. Additionally or alternatively, the identifier 108F may correspond to an entity that issued the personal card 100. For example, the identifier 108F may include a trade name, a logo, etc. of the entity. In the depicted embodiment, the identifier 108F is for VISA®.

Turning now to FIG. 1B, the back side 106 of the card body 102 of the personal card 100 may also carry information 108G-108K. Without limitation, that information 108G-108K may include one or more of a card holder signature 108I, a security code 108J, a magnetic strip 108K, a security feature 108H, and contact information 108G.

In these and other embodiments, the card holder signature 108I may be engraved into the back side 106 of the card body 102. Additionally or alternatively, the security code 108J may be carried by the front side 104 of the card body 102. Additionally or alternatively, the contact information 108G may include phone numbers for the entity that issued the personal card 100 and/or other service providers, for instance.

FIGS. 2A-2F illustrate sectional block diagrams of example personal cards 200A-200F (generally, personal cards 200). The personal cards 200 may be similar to and/or correspond to the personal card 100 of FIGS. 1A and 1B. Accordingly, some of the components and features (e.g., 104, 106, and 108) described with reference to FIGS. 1A and 1B are included in FIGS. 2A-2F. Additionally, like the personal card 100 of FIGS. 1A and 1B, the personal cards 200 of FIGS. 2A-2F may be substantially made from, consist essentially of, or consist of a precious metal or a precious metal alloy.

The personal cards 200 of FIGS. 2A-2F may include a substrate 202 and may include one or more coatings 204A and 204B (generally, coatings 204). In these and other embodiments, the substrate 202 may be made from a precious metal or a precious metal alloy alone or with one or more other materials and/or the coatings 204 may be made from a precious metal or a precious metal alloy alone or with one or more other materials. In some embodiments, the substrate 202 and the coatings 204 may be made from the same precious metal alone or with one or more other materials. In some alternative embodiments, the substrate 202 may be made from a precious metal and the coatings 204 may be made from a precious metal alloy. In yet alternative embodiments, the substrate 202 and the coatings 204 may be made from different alloys of a precious metal.

In each of the personal cards 200, the security feature 108A, the account number 108B, and the cardholder name 108C is included on the front side 104. Additionally, the magnetic strip 108K, the security feature 108H, and the contact information 108G is included on the back side 106. FIGS. 2A-2F illustrate various ways in which this and other information 108 may be carried on the personal cards 200.

Figure 2A:
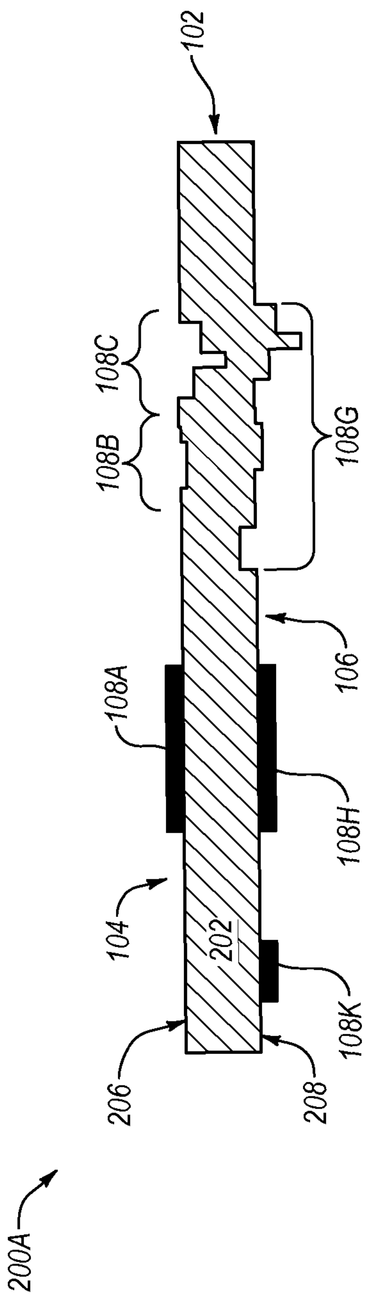
FIGS. 2A-2F illustrate sectional views of example embodiments of the personal card of FIGS. 1A and 1B, all in accordance with at least one embodiment described herein.

FIG. 2A depicts a first personal card 200A in which a substrate 202 may not include any coatings. Accordingly, in the first personal card 200A, the card body 102 may be essentially a unitary structure substantially made from a single material (e.g., a precious metal or alloy thereof).

In the depicted embodiment of the first personal card 200A, the account number 108B, the cardholder name 108C, and the contact information 108G may be defined by way of indentations and/or recesses (e.g., 108B, 108C, and a portion of 108G) in one or more of a front surface 206 or a back surface 208 of the substrate 202. A variety of techniques may be used to define the information 108B, 108C, and 108G in the substrate 202 including, but not limited to, laser engraving processes, mechanical engraving processes and masking and chemical etching processes.

Some information 108 may additionally or alternatively be defined using embossed areas (i.e., raised relative to surrounding areas) of the substrate 202. The embossed areas may form indicia that are raised relative to, or protrude from, one of the surfaces 206 or 208 of the substrate 202. In the first personal card 200A, a portion of the contact information 108G is embossed. The first personal card 200A includes a combination of recessed features and raised features. The visual distinctiveness of the information 108B, 108C, and 108G may be provided by disruptions in the surfaces 206 and 208 with respect to surrounding regions.

Additionally, some of the information 108K, 108A, and 108H may be otherwise carried by the card body 112. Without limitation, the information 108K, 108A, and 108H may be adhered to a surface of the card body 112. Non-limiting embodiments of such information 108K, 108A, and 108H include information defined by a material (e.g., a visually contrasting metal, a paint, oxidation of selected regions of the material of the card body, etc.) that has been applied to or formed on the surface of the substrate 202 by any suitable technique (e.g., plating, lamination, adhesion, chemical treatment, etc.); information 108 embodied in another structure (e.g., an integrated circuit chip, a holographic image, a magnetic strip, a signature stripe, etc.) secured to the substrate 202 (e.g., by adhesion, etc.); or any other suitable embodiment of information formed from or secured to the substrate 202 by any correspondingly suitable technique. Adhesion of the information 108K, 108A, and 108H to the card body 112 may be facilitated by altering one of the surfaces 206 and 208 of the substrate 202, such as by altering its texture, forming indentations for receiving the information 108K, 108A, and 108H, or the like.

Figure 2B:
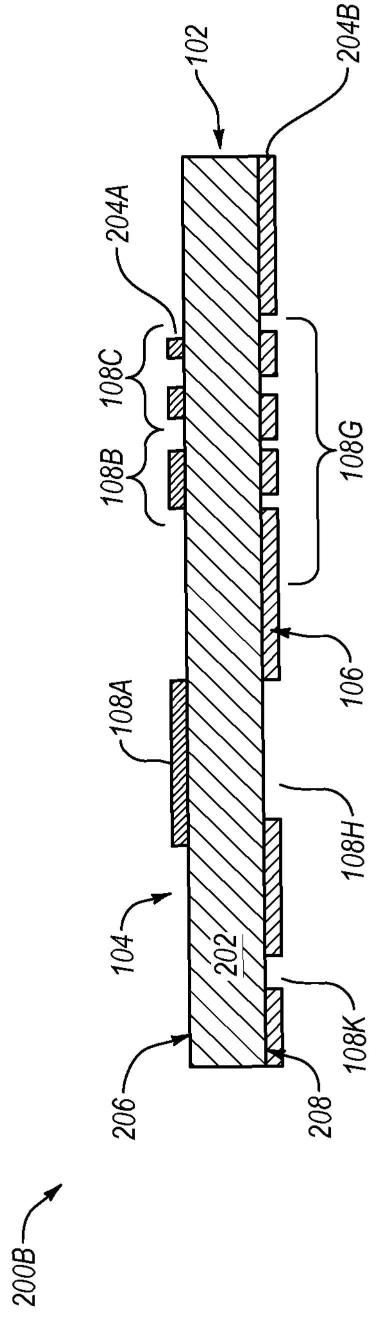

FIG. 2B illustrates a second personal card 200B. The second personal card 200B may include the substrate 202 and the coatings 204. In embodiments of the personal cards (e.g. 200B-200F) including one or more of the coatings 204, visual distinctiveness of the information 108 may result from color differences between the substrate 202, or the surfaces 206 or 208 thereof, and the coatings 204. For example, the substrate 202 may be a first color and an immediately adjacent region that includes some portion of the coating 204 may be a second color.

More specifically, the second personal card 200B in FIG. 2B depicts an embodiment including a first coating 204A on the front surface 206 and a second coating 204B on the back surface 208. One or more of the coatings 204 may be formed from a precious metal or a precious metal alloy, which may include a same base material (e.g., gold, etc.) as the substrate 202, but have a distinct color from a color of the substrate 202. Alternatively, the coating 204 may include an oxide of the material (or a component thereof) from which the substrate 202 is formed.

The first coating 204A may be applied to the substrate 202 to create indicia of the information 108. In this and other embodiments, the information 108A, 108B, and 108C may be defined through application of the first coating 204A to the surfaces 206 and/or 208 of the substrate 202 to create the characters, features, etc. of the information 108A, 108B, and 108C. The information 108A, 108B, and 108C may be formed by plating processes or in any other suitable way. Some example plating processes may include electrolytic plating processes, electro-less deposition processes, immersion plating processes, which may or may not be accompanied by masking and/or material removal processes. Alternatively, the information 108A, 108B, and 108C may be defined from oxidized regions created on one or more of the surfaces 206 and 208 of the substrate 202.

The second coating 204B may include essentially an inverse process to the first coating 204A. Specifically, the information 108 may be defined in the second coating 204B by forming recesses in the second coating 204B, which may be formed on one or more of the surfaces 206 and 208. Prior to forming the recesses, the second coating 204B may include and/or cover an entirety of one or more of the surfaces 206 or 208. The recesses may then be formed in the second coating 204B to define the indicia of the information 108. The recesses may extend completely through the second coating 204B exposing differently colored regions of the substrate 202, thereby imparting the information 108 with a color that visibly contrasts with the color of adjacent regions of the substrate 202.

Figure 2C:
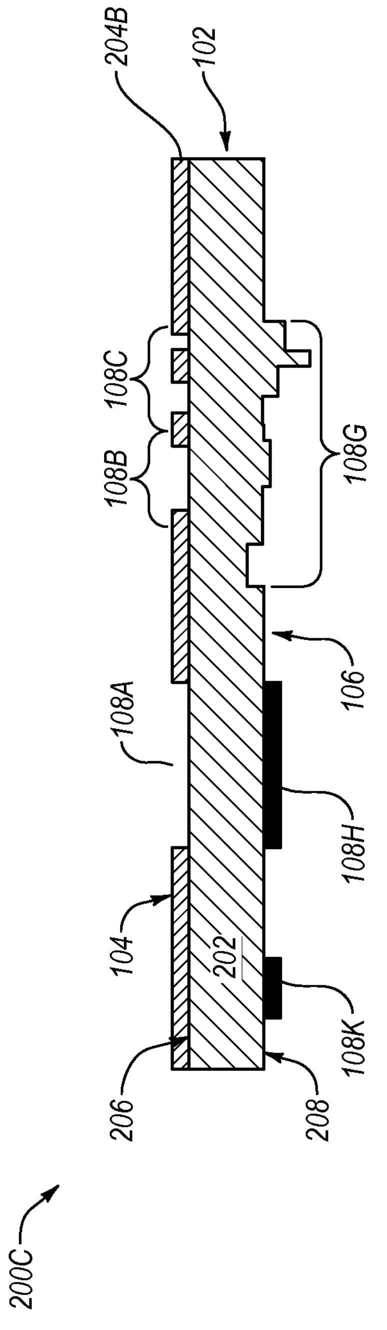

FIGS. 2C-2F illustrate combinations of features described with reference to FIGS. 2A and 2B. Specifically, each of the personal cards 200 depicted in FIGS. 2C-2F includes a distinct way in which the information 108 may be defined or adhered to the personal cards 200. For example. FIG. 2C illustrates a third personal card 200C in which the second coating 204B may be applied to the front surface 206 to define information 108A, 108B, and 108C. Additionally, in the third personal card 200C, information 108K and 108H may be affixed to the back side 106. Additionally, in the third personal card 200C, the information 108C may be defined through a combination of removing and embossing some portion of the substrate 202.

Figure 2D:
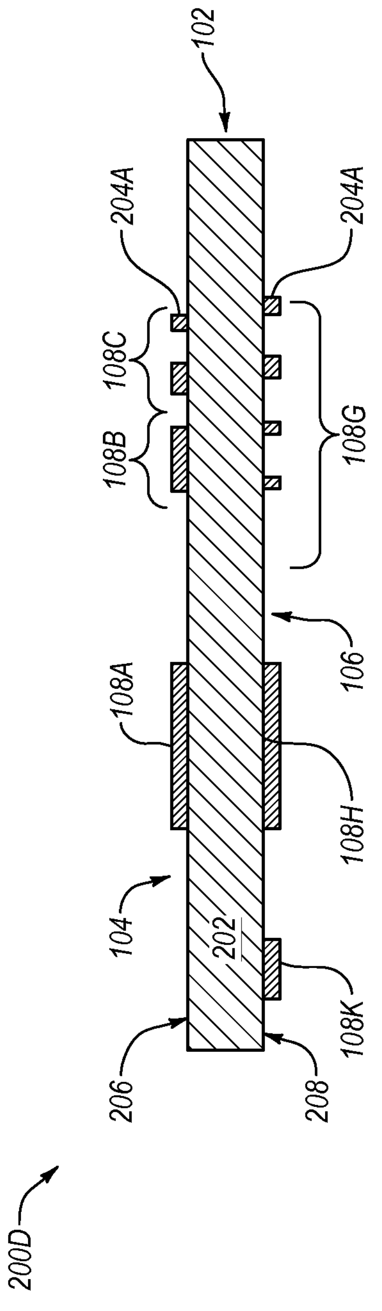
Figure 2E:
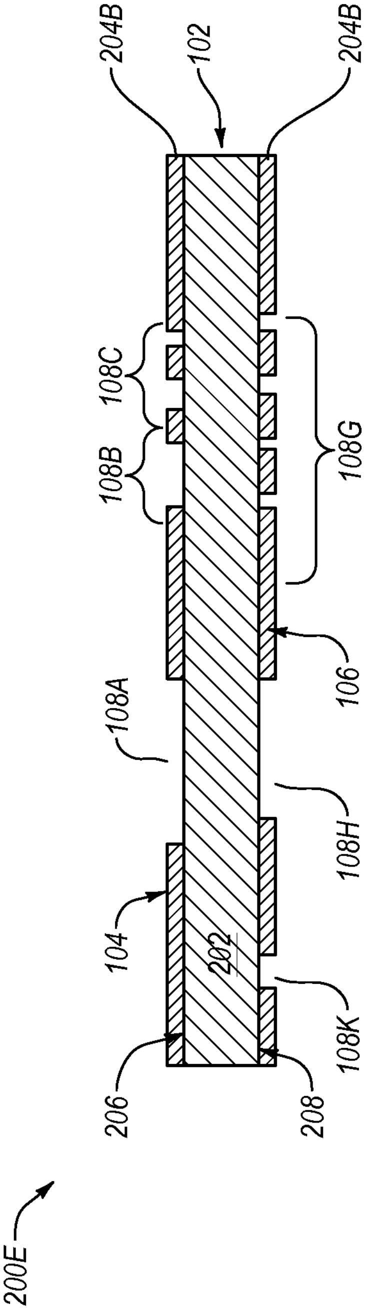
Figure 2F:
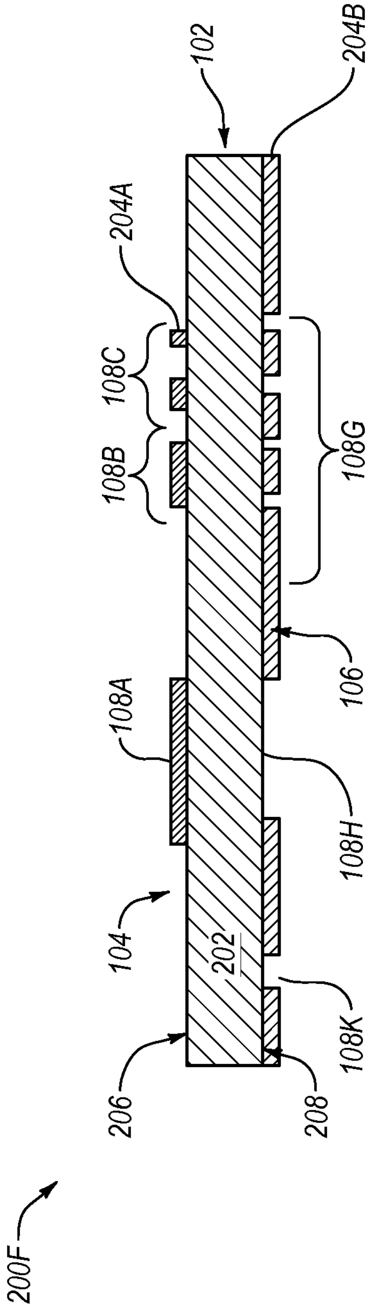

FIG. 2D illustrates a fourth personal card 200D in which the information 108 is defined using the first coating 204A. FIG. 2E illustrates a fifth personal card 200E in which the information 108 is defined using the second coating 204B. FIG. 2F illustrates a sixth personal card 200F including information 108 on the front side 104 being defined using the first coating 204A and information 108 on the back side 106 defined using the second coating 204B. As may be appreciated with the benefit of this disclosure, the personal cards 200 depicted in FIGS. 2A-2F are illustrative and not limiting. For example, one or more of the sides 104 and 106 may be absent information 108, a first coating 204A may be combined with information 108 adhered to one or more of the surfaces 206 and/or 208, information 108 may be defined in a first portion of one or more of the surfaces 206 or 208 using the first coating 204A and defined in a second portion using the second coating 204B, information 108 may be adhered to one or more of the coatings 204, etc.

Although the foregoing description includes many specifics, these should not be construed as limiting the scope of any of the appended claims, but merely as providing information pertinent to some specific embodiments that may fall within the scopes of the appended claims. Features from different embodiments may be employed in combination. In addition, other embodiments of the subject matter disclosed hereby may also be devised which lie within the scopes of the appended claims. The scope of each claim is, therefore, indicated and limited only by the appended claims and their legal equivalents. All additions, deletions and modifications to the disclosed subject matter that fall within the meaning and scopes of the claims are to be embraced by the claims.

What is claimed is:

1. A transaction card comprising:

a card body made from a precious metal alloy, the card body having a front surface and a back surface, wherein the card body comprises a substrate made from the precious metal alloy;

information, at least some portion of the information defined by disruptions to the precious metal alloy of the card body;

the card body includes a coating applied to one or more of the front surface and the back surface of the substrate;

the coating is made from a second precious metal alloy having a same base material as the precious metal alloy;

the coating has a different color than the substrate; and the information includes a second portion defined by a contrast in the colors between the coating and the substrate.

2. The transaction card of claim 1, wherein the disruptions include recesses made in the precious metal alloy of the card body.

3. The transaction card of claim 1, wherein the disruptions include embossed areas on the front surface or the back surface.

4. The transaction card of claim 1, wherein the precious metal alloy is substantially gold, platinum, or silver.

5. The transaction card of claim 1, wherein the information includes a second portion, the second portion being adhered to the front surface or the back surface of the card body.

6. The transaction card of claim 5, wherein the information includes a magnetic strip, one or more security features, an account number, a cardholder name, and contact information.

7. The transaction card of claim 6, wherein:

the magnetic strip and the security features are adhered to the front surface or the back surface of the card body; and the account number, the cardholder name, and the contact information are defined by disruptions in the precious metal alloy.

8. The transaction card of claim 7, wherein the transaction card conforms to the requirements of ISO/IEC 7810 ID-1.

9. A transaction card comprising:

a card body including a substrate, the substrate being substantially a first alloy of gold and a coating on a surface of the substrate, the coating being substantially a second alloy of gold, the second alloy of gold having a color different from the first alloy of gold; and information, a first portion of the information defined by disruptions to the first alloy of gold; and at least a second portion of the information defined by a contrast in color between the coating and the substrate.

10. The transaction card of claim 9, wherein a portion of the coating is removed to create the contrast in color between the coating and the substrate.

11. The transaction card of claim 9, wherein the coating is applied to the surface of the substrate create the contrast in color between the coating and the substrate.

12. The transaction card of claim 9, wherein the card body further includes a second coating on a second surface of the substrate, the second coating is substantially a third alloy of gold, the second coating defining a second portion of the information on the second surface of the substrate.

13. The transaction card of claim 9, wherein a second portion of the information is defined by disruptions in the substrate.

14. The transaction card of claim 13, wherein the disruptions include recesses made in the substrate.

15. The transaction card of claim 13, wherein the disruptions include embossed areas on the front surface or the back surface.

16. The transaction card of claim 13, wherein the information includes a third portion that is adhered to one of the surfaces of the substrate.

17. The transaction card of claim 16, wherein:

the information includes a magnetic strip, one or more security features, an account number, a card holder name, and contact information;

the magnetic strip and the security features are adhered to one of the surfaces of the substrate;

the account number and the cardholder name are defined by the contrast in color between the coating and the substrate; and the contact information is defined by disruptions in the substrate.

18. The transaction card of claim 9, wherein the transaction card substantially conforms to the requirements of ISO/IEC 7810 ID-1.

19. The transaction card of claim 9, wherein:

the first gold alloy is one of 24 karat (K) gold, 22 K gold, 18 K gold, 14 K gold, 10K gold, or 9 K gold; and the second gold alloy is another of 24 K gold, 22 K gold, 18 K gold, 14 K gold, 10K gold, or 9 K gold.

* * * * *